US011929699B2

(12) United States Patent
Park (10) Patent No.: US 11,929,699 B2
(45) Date of Patent: Mar. 12, 2024

(54) DOUBLE WOUND MOTOR CONTROL APPARATUS AND METHOD

(71) Applicant: HL MANDO CORPORATION, Gyeonggi-do (KR)

(72) Inventor: Jae Sang Park, Yongin-si (KR)

(73) Assignee: HL MANDO CORPORATION, Gyeonggi-Do (KR)

( * ) Notice: Subject to any disclaimer, the term of this patent is extended or adjusted under 35 U.S.C. 154(b) by 0 days.

(21) Appl. No.: 17/778,847

(22) PCT Filed: Oct. 15, 2020

(86) PCT No.: PCT/KR2020/014107
§ 371 (c)(1),
(2) Date: May 22, 2022

(87) PCT Pub. No.: WO2021/125528
PCT Pub. Date: Jun. 24, 2021

(65) Prior Publication Data
US 2022/0407448 A1    Dec. 22, 2022

(30) Foreign Application Priority Data
Dec. 17, 2019  (KR) .................. 10-2019-0168679

(51) Int. Cl.
*H02P 27/06* (2006.01)
*H02P 25/22* (2006.01)
(Continued)

(52) U.S. Cl.
CPC .............. *H02P 29/50* (2016.02); *H02P 25/22* (2013.01); *H02P 27/06* (2013.01); *H02P 29/028* (2013.01)

(58) Field of Classification Search
CPC .......... H02P 29/50; H02P 25/22; H02P 27/06; H02P 29/029
See application file for complete search history.

(56) References Cited

U.S. PATENT DOCUMENTS 5,319,297 A * 6/1994 Bahn .................... H02P 25/098
                                                            318/701
8,981,704 B2 * 3/2015 Endo .................... B62D 5/0487
                                                            318/490
(Continued)

FOREIGN PATENT DOCUMENTS

JP    2013-162622    8/2013
JP    2013-236486    11/2013
(Continued)

OTHER PUBLICATIONS

International Search Report for PCT/KR2020/014107 dated Feb. 2, 2021 (now published as WO 2021/125528) with English translation provided by WIPO.
(Continued)

*Primary Examiner* — Rina I Duda
(74) *Attorney, Agent, or Firm* — Ladas & Parry, LLP (57) ABSTRACT

The present disclosure relates to a double wound motor and a control method therefor, and comprises: a first inverter and a second inverter for supplying phase currents respectively to a first winding unit and a second winding unit of the double wound motor; a gate driver for driving switches respectively included in the first inverter and second inverter and detecting whether there is a switch abnormality in the first inverter or second inverter and whether there is a winding abnormality in the first winding unit and second winding unit; and a motor control unit for outputting a current command to attenuate a torque ripple in response to a torque ripple pattern according to the switch or winding abnormality.

11 Claims, 10 Drawing Sheets

(51) Int. Cl.
    *H02P 29/028*    (2016.01)
    *H02P 29/50*     (2016.01)

(56) References Cited

U.S. PATENT DOCUMENTS

| | | | | |
|---|---|---|---|---|
| 9,257,930 | B2* | 2/2016 | Suzuki | H02P 21/0003 |
| 2008/0092594 | A1* | 4/2008 | Vianello | B24B 9/102 |
| | | | | 65/61 |
| 2012/0209456 | A1* | 8/2012 | Harmon | B64C 39/024 |
| | | | | 903/903 |
| 2013/0009580 | A1* | 1/2013 | De Wergifosse | H02M 7/493 |
| | | | | 318/400.26 |
| 2013/0299271 | A1* | 11/2013 | Endo | B62D 5/0484 |
| | | | | 180/446 |
| 2014/0246999 | A1* | 9/2014 | Kezobo | B60L 3/0061 |
| | | | | 318/400.23 |
| 2016/0072416 | A1* | 3/2016 | Hirotani | H02K 1/276 |
| | | | | 318/400.2 |
| 2017/0033724 | A1* | 2/2017 | Kezobo | H02P 6/14 |
| 2017/0104437 | A1* | 4/2017 | Suzuki | H02P 29/032 |

FOREIGN PATENT DOCUMENTS

| | | |
|---|---|---|
| JP | 2014-176215 | 9/2014 |
| KR | 10-2016-0067790 | 6/2016 |

OTHER PUBLICATIONS

Written Opinion of the International Searching Authority for PCT/KR2020/014107 dated Feb. 2, 2021 (now published as WO 2021/125528) with English translation provided by Google Translate.

* cited by examiner

DOUBLE WOUND MOTOR CONTROL APPARATUS AND METHOD

CROSS-REFERENCE TO RELATED APPLICATIONS

The present application is the national stage of International Patent Application No. PCT/KR2020/014107 filed on Oct. 15, 2020, which claims the priority to Korean Patent Application No. 10-2019-0168679 filed in the Korean Intellectual Property Office on Dec. 17, 2019, the entire contents of which are incorporated herein by reference.

TECHNICAL FIELD

The present disclosure relates to a control apparatus and method for a double wound motor, and more particularly, to a control apparatus and method capable of reducing torque ripple without an additional configuration for a double wound motor applied to an eco-friendly vehicle.

BACKGROUND

In general, a DC motor consists of a stator made of magnets and a rotor made of windings. The winding of the rotor is connected to an external direct current power source through a brush, and as the rotor rotates, the polarity between the brush and the external power source continues to change, and the direction of the magnetic field generated in the rotor continues to change as well. That is, the magnetic field of the rotor is always maintained at a constant polarity with respect to the magnetic field of the stator, so that the rotational force of the motor is generated.

Meanwhile, in the case of a DC motor used in an Electronic Power Steering System (EPS) that provides steering auxiliary force for a vehicle, it is important to secure the reliability of the motor by achieving high power density, high efficiency, and low noise (low vibration).

To this end, it is important to reduce or cancel out torque ripple, which is the main cause of noise and vibration during the operation of the motor.

Recently, a three-phase wound motor has been applied in consideration of efficiency.

In addition, the double wound motor is designed to have a structure in which two different pairs of polyphase inputs of a single motor are possible by dividing the single motor into two electrically and mechanically. That is, it uses double windings and the inverter that controls the current supply to each winding is also designed with double windings.

The advantage of the double wound motor is that it is possible to drive the motor using the other inverter and winding even when an abnormality occurs in one inverter or one winding.

Therefore, it is applied to areas where safety is a priority. It is to generate brake torque in an eco-friendly vehicle such as an electric vehicle, but in this case, the configuration of an additional switching circuit is required.

Figure 1:
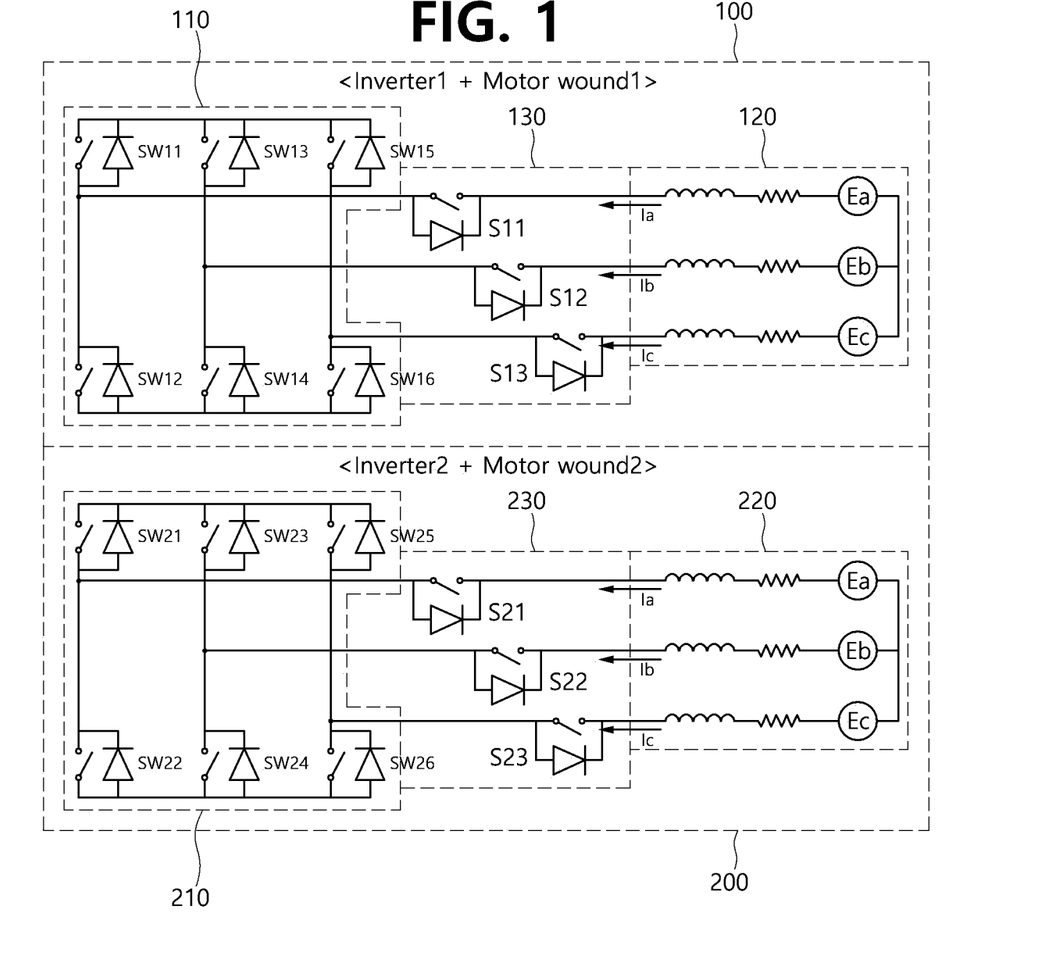
FIG. 1 is a configuration diagram of a conventional control apparatus for a double wound motor.

FIG. 1 is a control circuit diagram of a conventional double wound motor.

Referring to FIG. 1, the control circuit of a conventional double wound motor includes a first controller 100 including a first phase blocking unit 130 positioned between a first inverter 110 and a first winding unit 120, and a second controller 200 including a second phase blocking unit 230 positioned between a second inverter 210 and a second winding unit 220.

In the first inverter 110, a pair of switches connected in series to each other are arranged in parallel with the same number of phases. That is, in the case of three phases, it is configured to include six switches SW11, SW12, SW13, SW14, SW15, and SW16.

The second inverter 210 also has the same structure as the first inverter 110 and includes the same number and arrangement of switches SW21, SW22, SW23, SW24, SW25 and SW26 as the first inverter 110.

The switches SW11 to SW16 and SW21 to SW26 of the first inverter 110 and the second inverter 210 include a transistor and a diode, and they are selectively driven by a gate driver (not shown) that controls the supply of gate voltage to the gates of the transistors.

Currents of each phase from the first inverter 110 are respectively supplied to the windings of the first winding unit 120 to rotate the rotor of the motor.

The first phase blocking unit 130 is positioned between the first inverter 110 and the first winding unit 120, and the first phase blocking unit 130 includes block switches S11, S12, and S13 serving as switches for each phase.

Similarly, between the second inverter 210 and the second winding unit 220, the second phase blocking unit 230 having the block switches S21, S22, and S23 is positioned.

In the first phase blocking unit 130 and the second phase blocking unit 230, also the operation of their block switches S11 to S13 and S21 to S23 is controlled by the gate driver.

The first phase blocking unit 130 and the second phase blocking unit 230 serve to block torque ripple.

For example, when there is an abnormality in the first inverter 110, the block switch of the first phase blocking unit 130 is blocked to block the generation of torque ripple.

More specifically, when the switch SW11 of the first inverter 110 is short-circuited, the gate driver blocks the block switch S11 of the first phase blocking unit 130 that blocks the current of the same phase to block the generation of torque ripple that occurs according to the abnormality of the switch SW11 of the first inverter 110.

When torque ripple occurs in a double wound motor applied to an eco-friendly vehicle such as an electric vehicle, there is a problem in that a large change in driving feeling occurs, and in order to solve this problem, an additional apparatus is conventionally used.

As in the above example, the conventional control apparatus for a double wound motor includes a block switch for each phase in order to block torque ripple when a failure occurs in an inverter or a winding.

Accordingly, there were problems in that the circuit has a relatively complicated configuration, the gate driver for controlling the circuit also has a relatively complicated configuration, the probability of failure according to the complexity of the configuration increases, the cost increases, and more space is required.

In addition, there is a problem that the conventional control apparatus including the block switch can block the torque ripple generated by the abnormality on the inverter side, but cannot block the torque ripple generated by the abnormality on the motor winding side.

SUMMARY

Technical Problem

The present disclosure is directed to providing a control apparatus and method for a double wound motor capable of reducing the occurrence of torque ripple without adding hardware such as a separate block switch.

In addition, the present disclosure is directed to providing a control apparatus and method for a double wound motor capable of reducing torque ripple caused by abnormalities on the motor winding-side as well as abnormalities on the inverter-side.

In particular, according to the present disclosure, by minimizing the influence of torque ripple without adding additional hardware, it is possible to reduce the possibility of failure through the simplification of the control circuit, reduce the cost, and facilitate the design of the circuit.

Technical Solution

A control apparatus for a double wound motor according to an aspect of the present disclosure comprises: a first inverter and a second inverter for supplying phase currents respectively to a first winding unit and a second winding unit of the double wound motor; a gate driver for driving switches respectively included in the first inverter and second inverter and detecting whether there is a switch abnormality in the first inverter or second inverter and whether there is a winding abnormality in the first winding unit and second winding unit; and a motor control unit for outputting a current command to attenuate a torque ripple in response to a torque ripple pattern according to the switch or winding abnormality.

In an embodiment of the present disclosure, the motor control unit may store different types of torque ripple information according to a position of a short-circuited switch, and when information on a switch in which a short circuit occurred is received from the gate driver, may perform current control according to the information on the switch in which the short circuit occurred.

In an embodiment of the present disclosure, the motor control unit may store torque ripple information when the winding of the first winding unit or the second winding unit is short-circuited to ground and when a short circuit occurs between windings, and may perform current control by classifying a short circuit between a winding and ground or a short circuit between windings according to the current detected by the gate driver.

A control method for a double wound motor according to another aspect of the present disclosure comprises: a) storing torque ripple information according to an abnormality occurrence type and a current control command according to a form of torque ripple in the motor control unit; b) detecting whether an abnormality has occurred in an inverter or a winding unit in a gate driver; and c) executing a current control command in the motor control unit according to the type of abnormality detected in step b).

In an embodiment of the present disclosure, in the step a), the abnormality occurrence type may be an abnormality in an inverter or a winding unit, and the abnormality occurrence type of the inverter may be a position of a switch in which a short circuit occurred among comprised switches.

In an embodiment of the present disclosure, in the step a), the abnormality occurrence type may be an abnormality in an inverter or a winding unit, and the abnormality occurrence type of the winding unit may be a short circuit between winding and ground or short circuit between windings.

In an embodiment of the present disclosure, the step b) may detect the abnormality occurrence type by detecting phase current or counter electromotive voltage.

Advantageous Effects

The present disclosure can reduce the influence of torque ripple by storing in advance the form of the control current corresponding to the form of the torque ripple generated according to a failure pattern of the inverter, and performing control by predicting the torque ripple when a failure occurs.

BRIEF DESCRIPTION OF THE DRAWINGS

The above and other objects, features, and advantages of the present disclosure will become more apparent to those of ordinary skill in the art by describing exemplary embodiments thereof in detail with reference to the accompanying drawings, in which.

<Description of Symbols>

| | |
|---|---|
| 10: first inverter | 20: second inverter |
| 30: first winding unit | 40: second winding unit |
| 50: gate driver | 60: motor control unit |

DETAILED DESCRIPTION OF THE EMBODIMENTS

Hereinafter, a control apparatus and method for a double wound motor of the present disclosure will be described in detail with reference to the accompanying drawings.

Embodiments of the present disclosure are provided to describe the present disclosure more fully to those skilled in the art, the embodiments described below can be modified into various other forms, and the scope of the present disclosure is not limited to the following embodiments. Rather, these embodiments make the present disclosure more meaningful and complete and are provided for fully conveying the concept of the present disclosure to those skilled in the art.

The terminologies used herein are for the purpose of describing particular embodiments only and are not intended to be limiting to the present disclosure. As used herein, the singular forms are intended to include the plural forms as well, unless the context clearly indicates otherwise. In addition, the terms "comprise" and/or "comprising," when used in this specification, specify the presence of stated shapes, integers, steps, operations, members, elements and/or a group thereof but do not preclude the presence or addition of one or more other shapes, integers, steps, operations, members, elements, and/or groups thereof. As used herein, the term "and/or" includes any one of and all combinations of one or more of the relevant listed items.

Although the terms "first," "second," etc. are used herein to describe various members, regions and/or parts, it is apparent that these members, components, regions, layers and/or parts are not limited by these terms. These terms do not imply any particular order, top, bottom, or superiority and are used only to distinguish one member, region, or part from another member, region, or part. Thus, the first member, the first region, or the first part described below may refer to the second member, the second region, or the second part without departing from the teachings of the present disclosure.

Hereinafter, the embodiments of the present disclosure are described with reference to the drawings schematically illustrating the embodiments of the present disclosure. In the drawings, for example, variations in the illustrated shape may be expected depending on manufacturing techniques and/or tolerances. Accordingly, the embodiments of the present disclosure should not be construed as being limited to any particular shape of the regions illustrated herein and should include, for example, variations in shape resulting from manufacturing.

Figure 2:
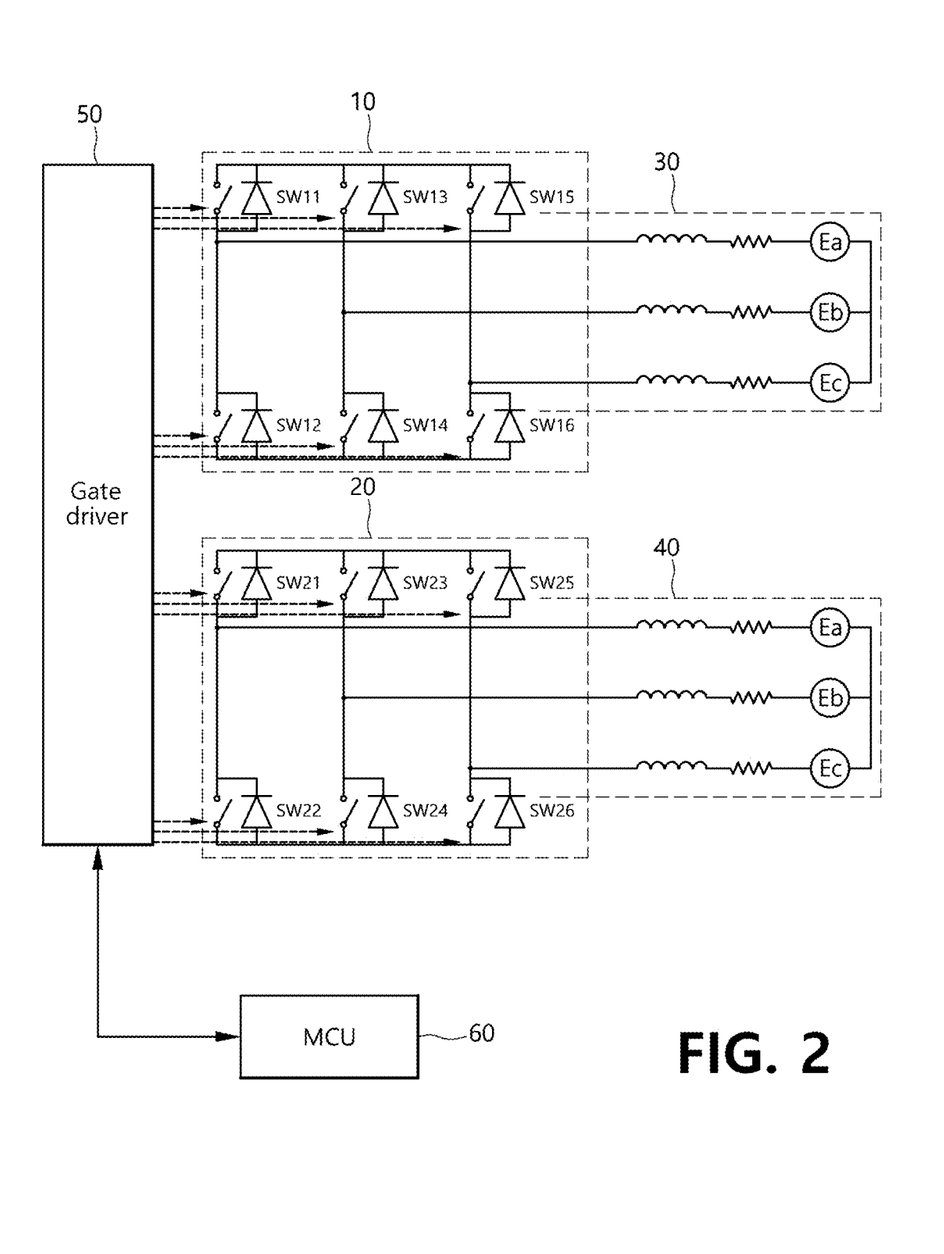
FIG. 2 is a configuration diagram of a control apparatus for a double wound motor of the present disclosure.

FIG. 2 is a block configuration diagram of a control apparatus for a double wound motor according to a preferred embodiment of the present disclosure.

Referring to FIG. 2, the present disclosure includes a first inverter 10 for controlling a current supplied to a first winding unit 30, a second inverter 20 for controlling a current supplied to a second winding unit 40, a gate driver 50 that controls driving of switches of the first inverter 10 and the second inverter 20 and detects whether the switches are normally driven, and a motor control unit 60 that reduces torque ripple generated when a switch malfunctions by outputting a control current that cancels out a pre-stored form of torque ripple according to the detection result of the gate driver 50.

Hereinafter, the configuration and operation of the control circuit of a double wound motor according to a preferred embodiment of the present disclosure configured as above will be described in detail.

First, the present disclosure relates to a control apparatus and method applied to a double wound motor including a first winding unit 30 and a second winding unit 40 in the same motor.

The first winding unit 30 and the second winding unit 40 each include polyphase windings.

Each of the switches of the first inverter 10 and the second inverter 20 is driven by the gate driver 50 controlled by the motor control unit 60 to supply current to each winding of the first winding unit 30 and the second winding unit 40.

FIG. 2 is a diagram on the assumption that a double wound motor to be controlled is a three-phase motor.

In the first inverter 10, a pair of switches connected in series with each other is provided for each phase, and the pairs of switches of each phase are connected in parallel with each other.

That is, the first inverter 10 includes six switches SW11, SW12, SW13, SW14, SW15, and SW16.

The second inverter 20 having the same configuration also includes six switches SW21, SW22, SW23, SW24, SW25, and SW26.

Among the switches of the first inverter 10 and the second inverter 20, the same state control is performed on switches located at the same position.

Figure 3:
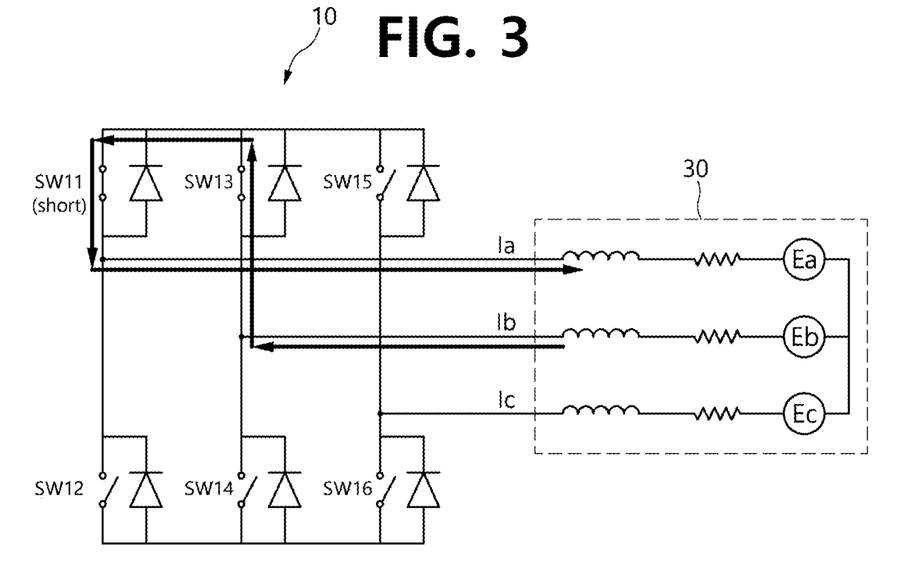
FIGS. 3 to 5 are each a flow chart of the phase current when one of the inverter switches is abnormal.
Figure 4:
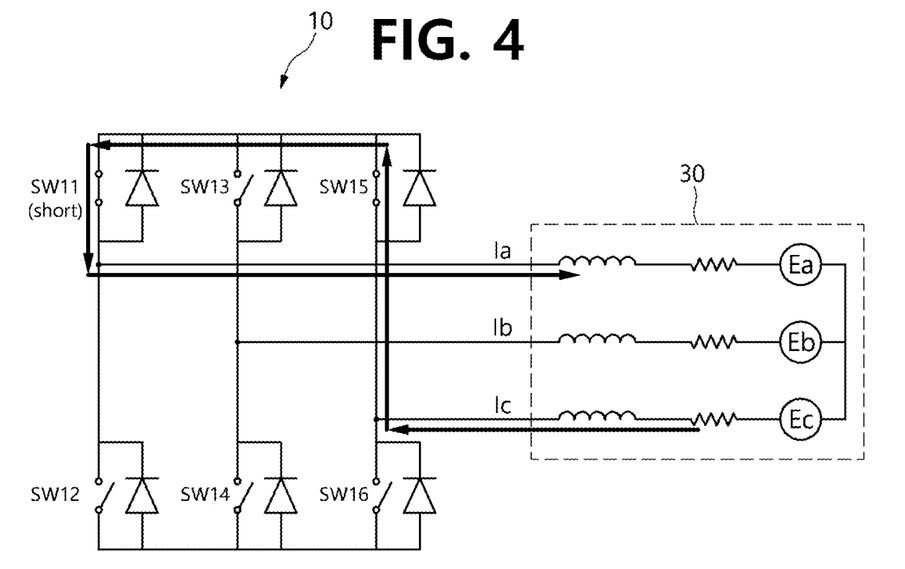
Figure 5:
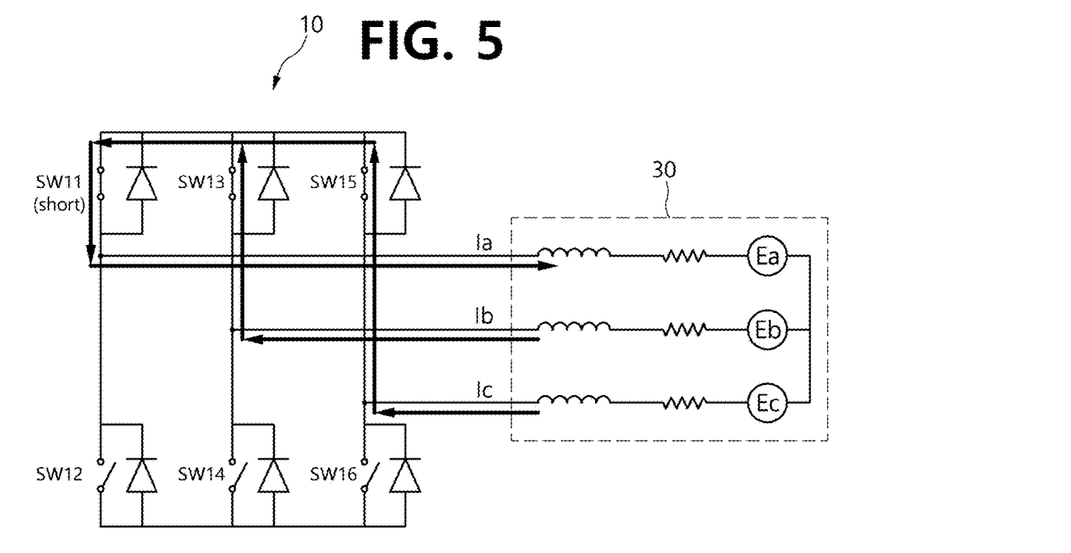

FIGS. 3 to 5 are circuit diagrams illustrating the phase current flow in a state in which the switch SW11 of the first inverter 10 is short-circuited, respectively.

FIG. 3 shows a state in which the switch SW13 of the b-phase (or v-phase) is closed, and at this time, the flow of the b-phase current is shown.

Similarly, FIG. 4 shows a state in which the switch SW15 of the c-phase (or w-phase) is closed, and at this time, the flow of the c-phase current is shown.

Similarly, FIG. 5 shows the phase current flow in a state in which both the b-phase and c-phase switches SW13 and SW15 are closed.

Figure 6:
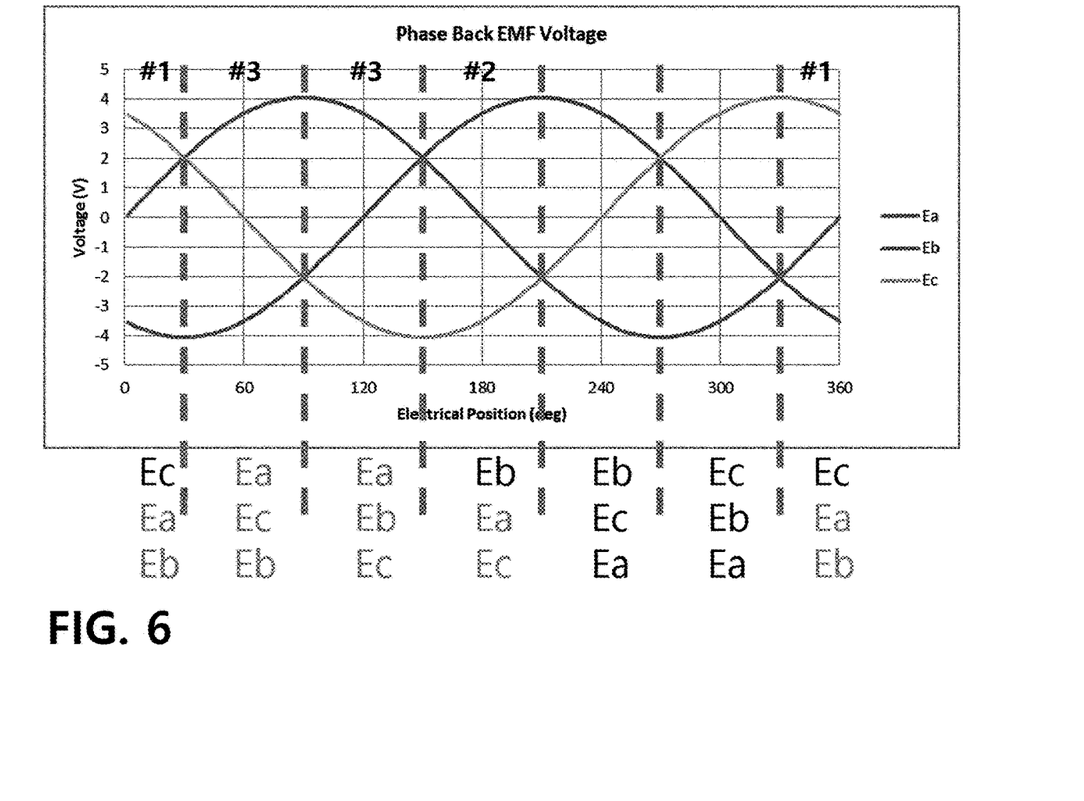
FIG. 6 is a phase current waveform diagram.

FIG. 6 is a graph of counter electromotive voltage.

As such, when an abnormality occurs in the specific switch SW11, an abnormality occurs in the normal counter electromotive force, and a characteristic torque ripple is generated according to the position of the abnormal switch.

Figure 7:
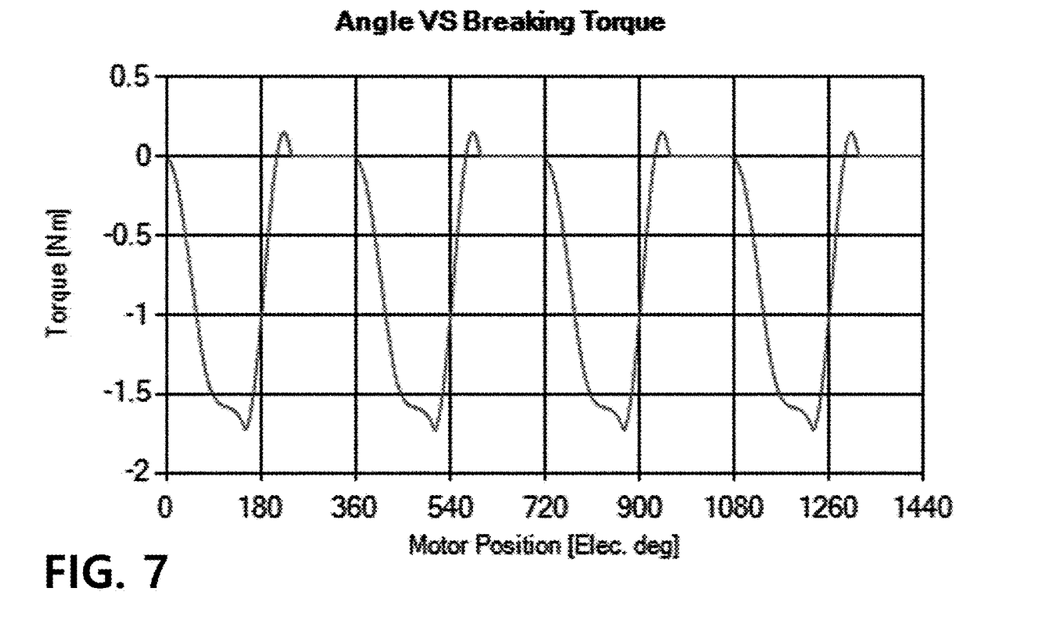
FIG. 7 is a waveform diagram of torque when one of the inverter switches is abnormal.

FIG. 7 is a graph showing the type of torque ripple when the upper switch SW11 of the a-phase is short-circuited.

It represents the breaking torque generated according to the angle of the motor rotor, and although it is constant, unstable torque is generated by the occurrence of torque ripple.

Figure 8:
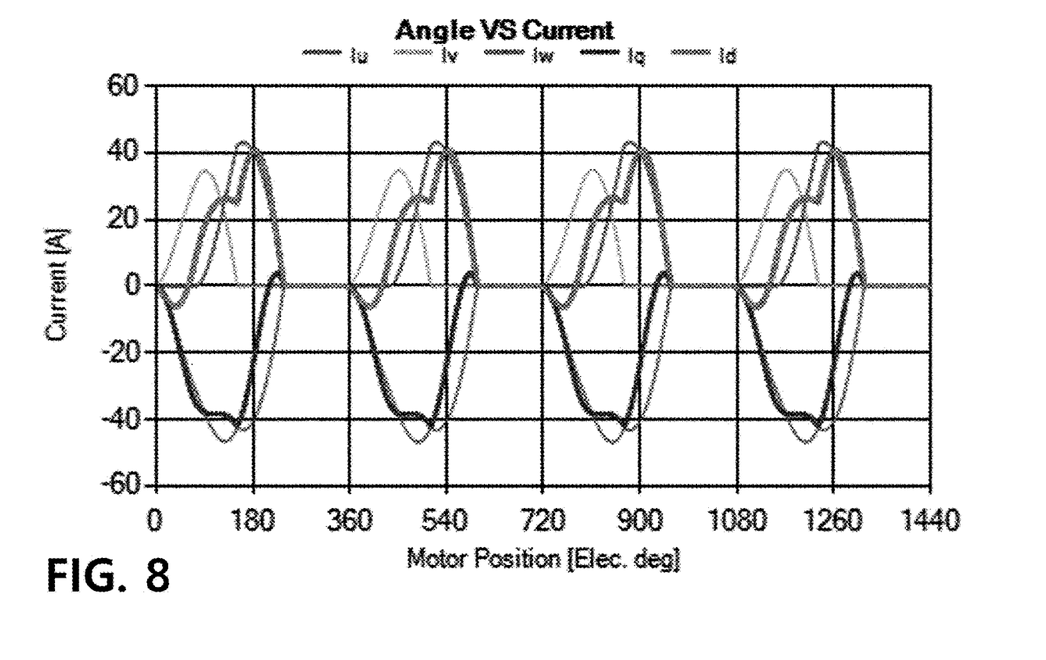
FIG. 8 is a waveform diagram of a phase current and a shaft current in the state of FIG. 7.

FIG. 8 is a graph of a phase current and a shaft current when the upper switch SW11 of a-phase is short-circuited.

As shown in this figure, the shaft currents Iq and Id also have a current change period corresponding to the torque ripple of FIG. 7.

FIGS. 9 to 12 are phase current flow charts when the switches SW11 and SW12 of the a-phase (or u-phase) of the first inverter 10 is short-circuited, respectively.

Figure 9:
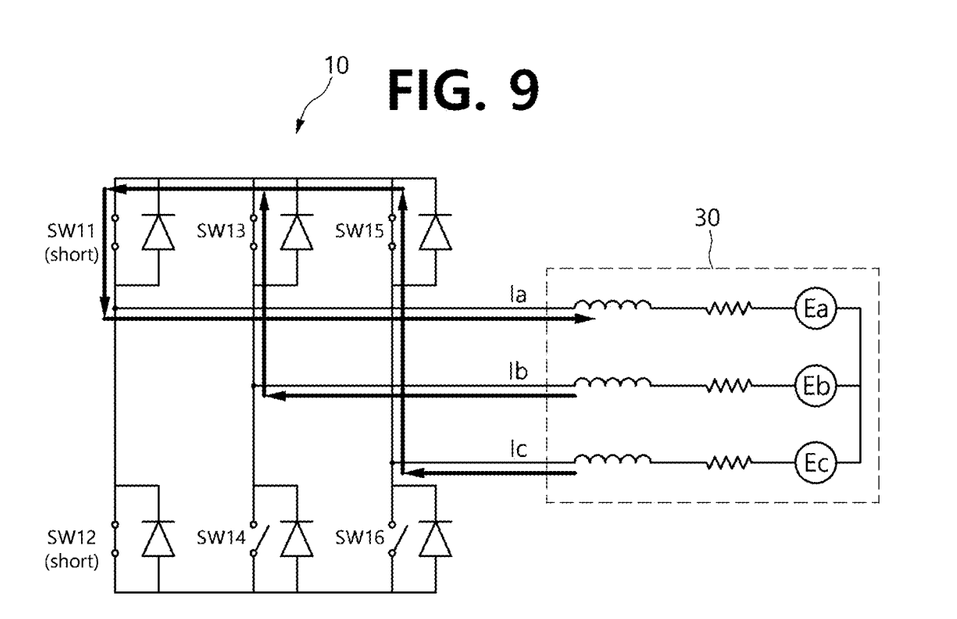
FIGS. 9 to 12 are each a flow chart of the phase current when two or more switches in one phase of inverter switches are abnormal.
Figure 10:
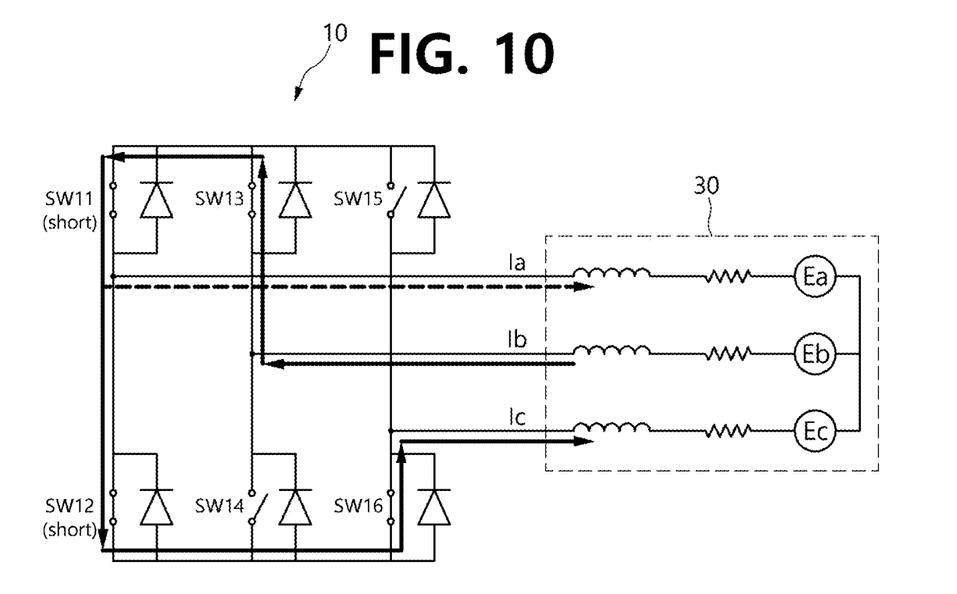

FIG. 9 shows the phase current flow in a state in which the upper switches SW13 and SW15 of the b-phase (or v-phase) and the c-phase (or w-phase) are all closed, and FIG. 10 shows the phase current flow in a state in which the upper switch SW13 of the b-phase and the lower switch SW16 of the c-phase are closed.

Figure 11:
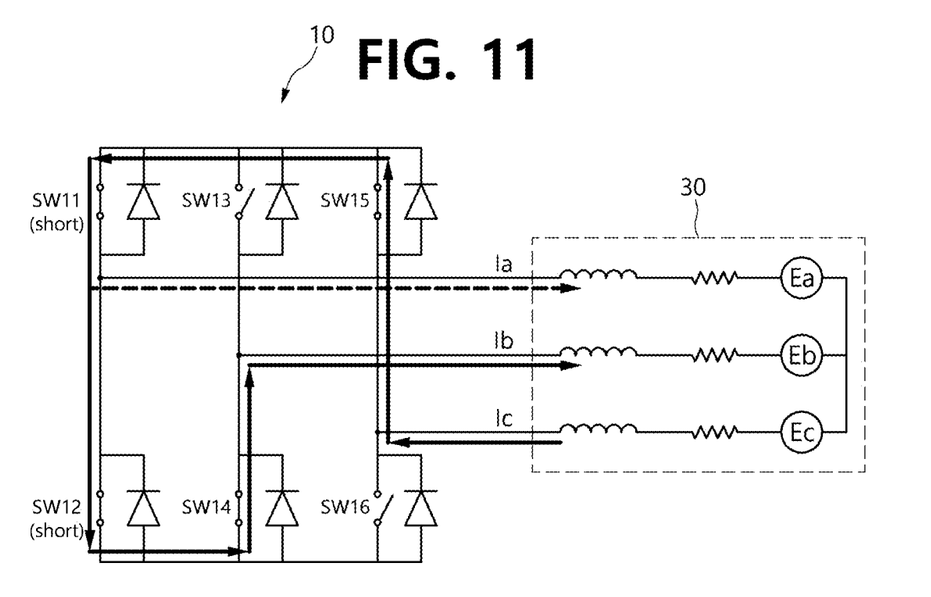
Figure 12:
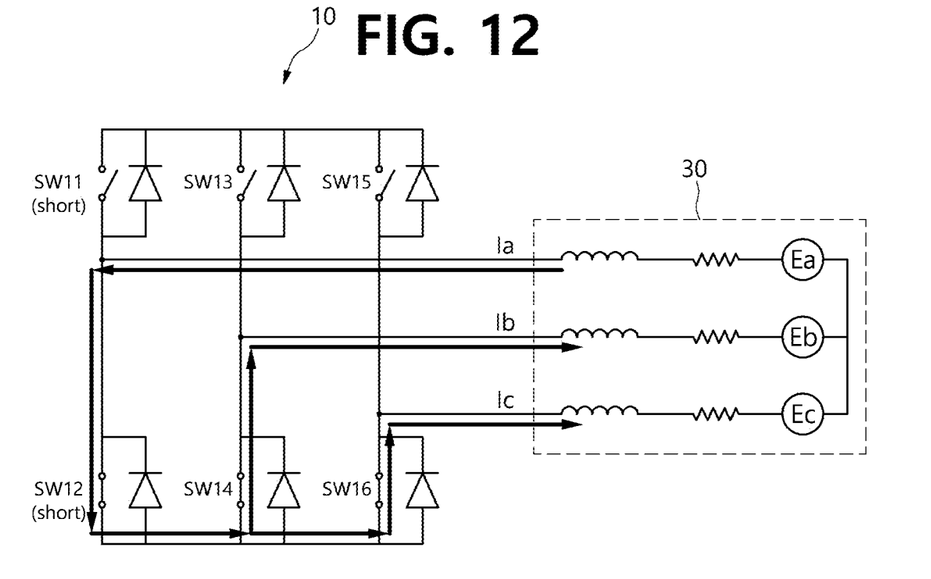

FIG. 11 shows the phase current flow in a state in which the upper switch SW15 of the c-phase and the lower switch SW14 of the b-phase are closed, and FIG. 12 shows the phase current flow in a state in which the lower switches SW14 and SW16 of the b-phase and the c-phase are closed.

As such, when both switches SW11 and SW12 of the a-phase are short-circuited, the flow of the phase current is different from the case where only one switch SW11 described with reference to FIGS. 3 to 5 is short-circuited, and thus the torque ripple also occurs in a different form.

Figure 13:
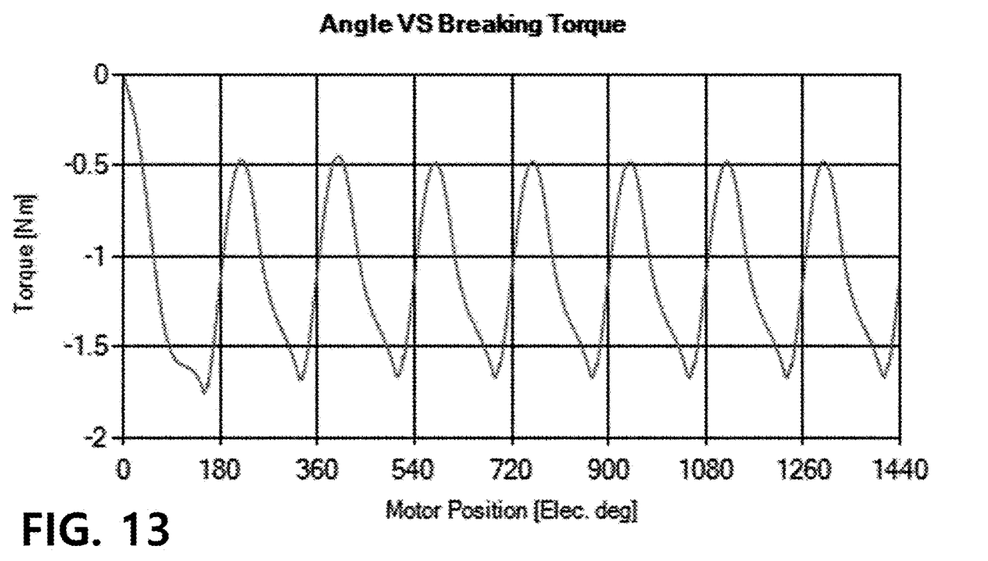
FIG. 13 is a graph of a breaking torque according to a motor rotation angle when two or more switches in one phase of inverter switches are abnormal.

FIG. 13 is a graph of breaking torque according to a motor rotation angle.

As shown in FIG. 13, although it has a constant torque form, a stable torque is not formed due to the occurrence of torque ripple.

Comparing the graph of FIG. 13 and the previously described graph of FIG. 7, there is a difference in the form of torque and torque ripple generated according to the failure position of the switch.

Figure 14:
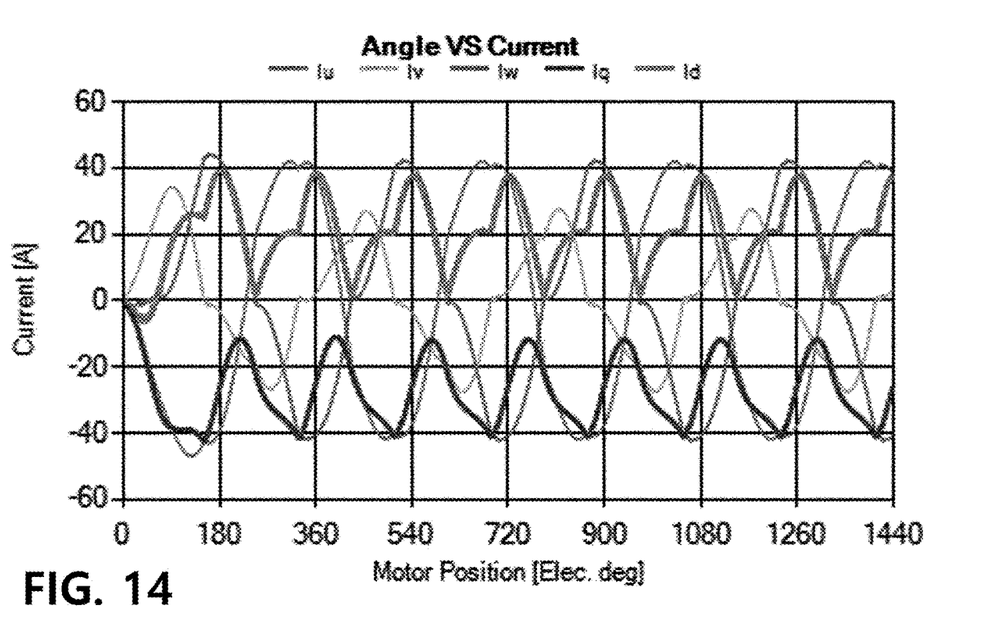
FIG. 14 is a waveform diagram of a phase current and a shaft current of FIG. 13.

This can also be seen in the phase current graph of FIG. 14.

Comparing the phase current graph of FIG. 14 and FIG. 8 showing the phase current graph when only one switch SW11 is short-circuited, it can be seen that the peak values of the shaft currents Id and Iq do not differ much, but the period in which the peak appears is shortened.

As such, there is a difference in the form of torque ripple generated at each failure position of the inverter switch, and current control that can cancel out this difference is possible.

The inverter switch failure position can be detected in the gate driver 50 through current detection, and the motor control unit 60 that stores the form information of the torque ripple for each failure position and a control current value capable of cancelling out it may cancel out the generated torque ripple through current control according to the failure position.

Also, according to the present disclosure, it is possible to check the form of torque ripple due to abnormality in the winding of the motor by tracking the change in phase current or counter electromotive voltage, and to perform control to attenuate the torque ripple.

Figure 15:
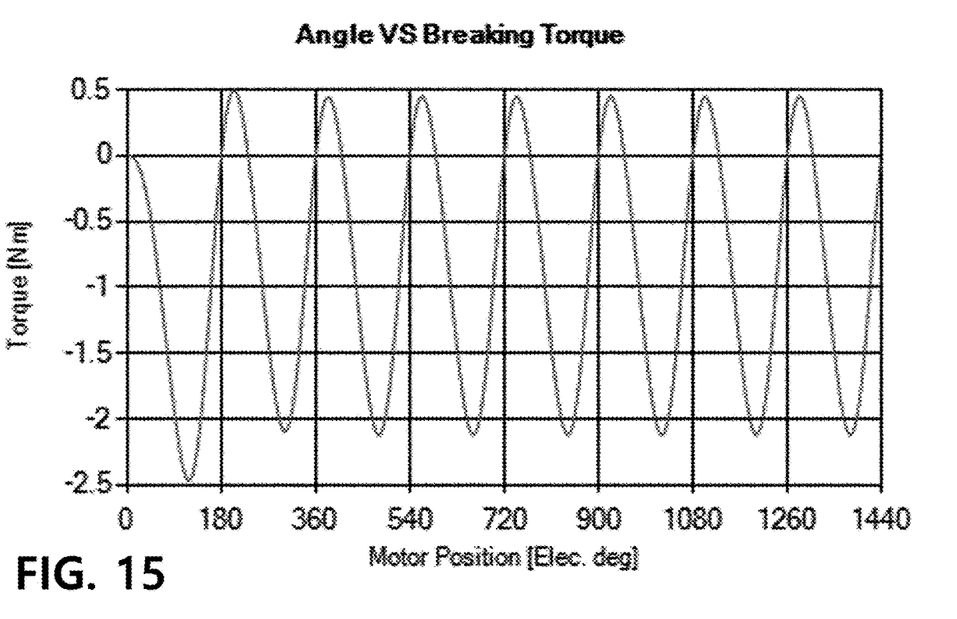
FIG. 15 is a graph showing a breaking torque according to an angle when a winding and a ground line of the motor are short-circuited.
Figure 16:
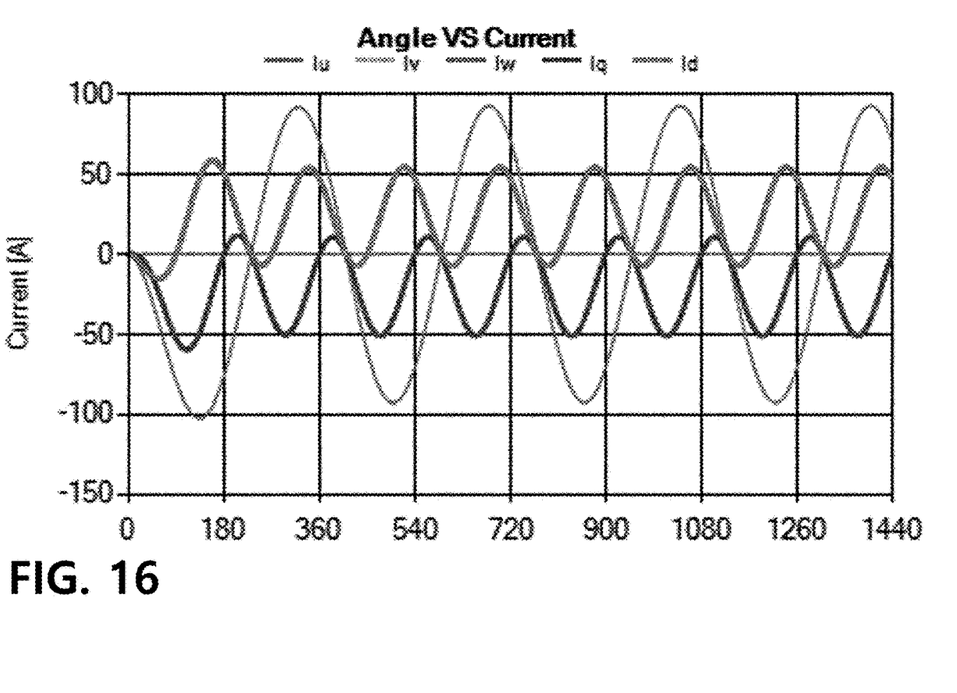
FIG. 16 is a graph showing a phase current and a shaft current when a winding and a ground line are short-circuited as in FIG. 15.

FIG. 15 is a graph showing a breaking torque according to an angle when a winding and a ground line of the motor are short-circuited, and FIG. 16 is a graph showing a phase current and a shaft current when a winding and a ground line are short-circuited as in FIG. 15.

As shown in these figures, the short circuit of the winding unit generates a breaking torque ripple in a different pattern from that of the switch short of the inverter, and the form of the phase current and the shaft current also shows a clear difference.

Accordingly, the motor control unit 60 may distinguish an inverter-side abnormality and a motor winding-side abnormality according to the detected current, and may perform current control according to the detected type of abnormality.

Figure 17:
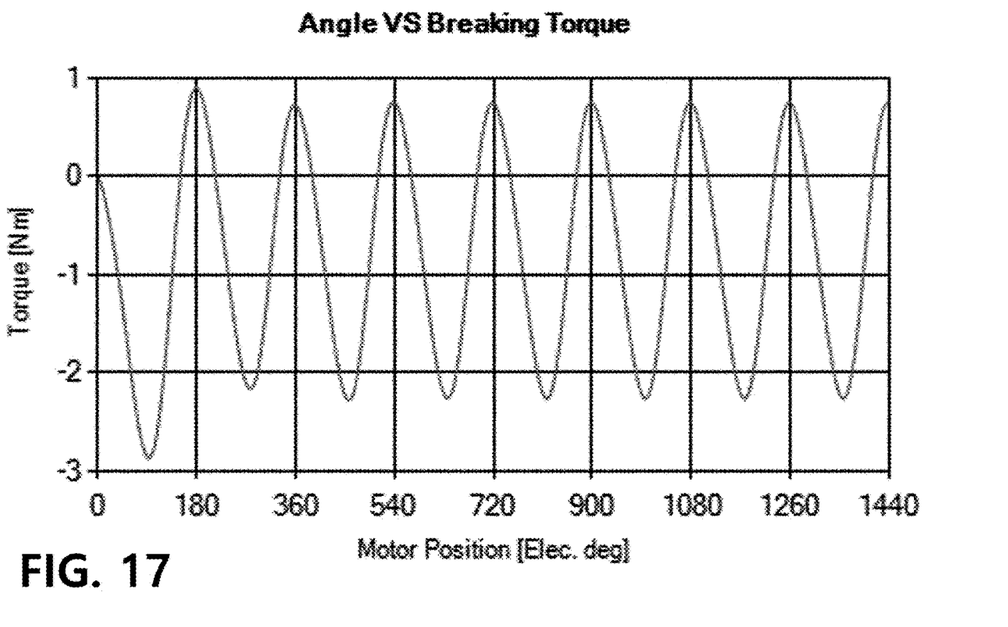
FIG. 17 is a graph of breaking torque according to an angle when a short circuit occurs between windings of the motor.
Figure 18:
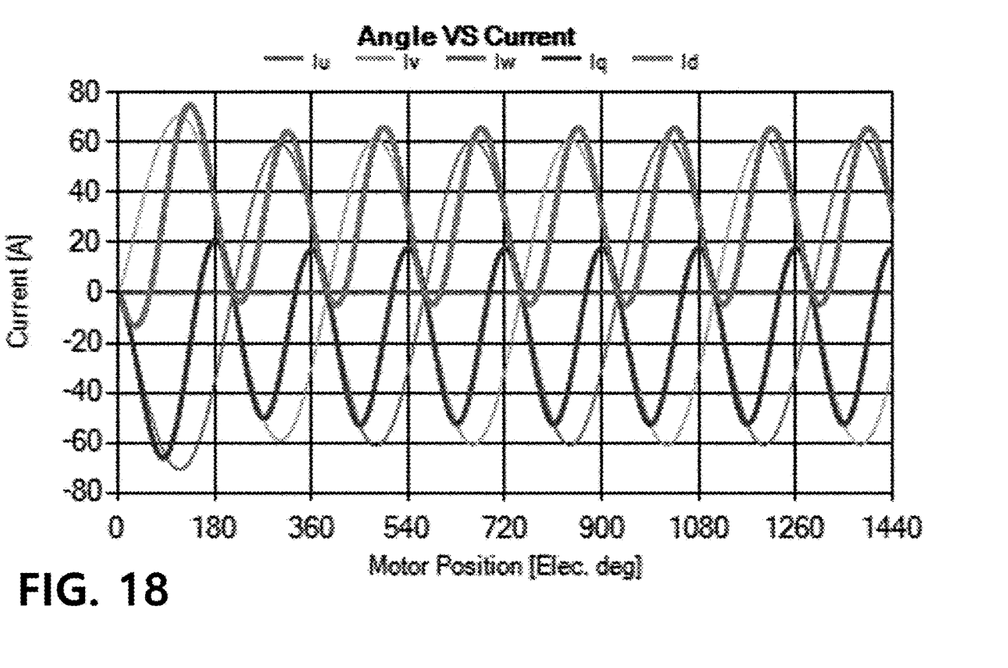
FIG. 18 is a graph showing a phase current and a shaft current when a short circuit occurs between windings of the motor as in FIG. 17.

FIG. 17 is a graph of breaking torque according to an angle when a short circuit occurs between windings of the motor, and FIG. 18 a graph showing a phase current and a shaft current when a short circuit occurs between windings of the motor as in FIG. 17.

Referring to FIG. 17, when a short circuit occurs between windings, it can be seen that torque ripple is generated in a different pattern from the case where a short circuit occurs between the windings and the ground described above with reference to FIG. 15.

The current waveform of FIG. 18 also shows a clear difference from the current waveform of FIG. 16 and is distinguishable, so the motor control unit 60 can determine the type of motor winding abnormality as well as the occurrence of the motor winding abnormality, and can control the motor according to the type, thereby cancelling out the torque ripple.

As such, the present disclosure can reduce torque ripple without adding additional hardware by checking the torque ripple pattern due to abnormality in advance and programming a current command capable of cancelling out each torque ripple in the motor control unit.

In addition, according to the present disclosure, it is possible to cancel out torque ripple caused by abnormalities on the inverter-side as well as abnormalities on the motor winding-side, thereby enhancing the torque ripple removal effect.

It will be apparent to those skilled in the art that the present disclosure is not limited to the above-described embodiments and may be variously modified and changed within a range which does not depart from the technical gist of the present disclosure.

INDUSTRIAL APPLICABILITY

The present disclosure reduces the torque ripple of a double wound motor applied to an eco-friendly vehicle such as an electric vehicle by using a natural law, and has industrial applicability.

What is claimed is:

1. A control apparatus for a double wound motor, the control apparatus comprising:
    a first inverter and a second inverter configured to supply phase currents to a first winding unit and a second winding unit of the double wound motor, respectively;
    a gate driver configured to drive switches comprised in the first inverter and the second inverter; and
    a motor controller configured to store a plurality of current commands corresponding to pre-stored different patterns of torque ripple, check a pattern of torque ripple in the double wound motor, and output one of the stored current commands corresponding to the checked pattern of torque ripple,
    wherein the motor controller is configured to:
    store another pattern of torque ripple when a winding of the first or second winding unit is short-circuited to ground or when a short circuit occurs between the winding of the first winding unit and the winding of the second winding unit; and
    perform current control differently depending on which short circuit occurs among a short circuit between the ground and the winding of the first or second winding unit and another short circuit between the winding of the first winding unit and the winding of the second winding unit.

2. The control apparatus for a double wound motor of claim 1,
    wherein the motor controller is configured to:
    store the different patterns of torque ripple according to a position of a short-circuited switch, and
    when information on a switch in which a short circuit occurred is received from the gate driver, perform current control according to the information on the switch in which the short circuit occurred.

3. The control apparatus for a double wound motor of claim 1,
    wherein the motor controller is configured to:
    distinguish between the short circuit between the first or second winding and the ground and the another short circuit between the first windings and the second winding according to a current detected by the gate driver.

4. The control apparatus for a double wound motor of claim 1, wherein the motor controller is configured to track phase current or counter electromotive voltage to check the pattern of torque ripple in the double wound motor.

5. The control apparatus for a double wound motor of claim 1, wherein the gate driver is configured to detect whether there is a switch abnormality in the first inverter or second inverter and whether there is a winding abnormality in the first winding unit and second winding unit.

6. A control method for a double wound motor, the control method comprising:
- storing a plurality of current control commands corresponding to pre-stored different patterns of torque ripple;
- checking a pattern of torque ripple in the double wound motor; and
- outputting one of the stored current control commands corresponding to the checked pattern of torque ripple, wherein the control method further comprises:
- storing another pattern of torque ripple when a winding of the first or second winding unit is short-circuited to ground or when a short circuit occurs between the winding of the first winding unit and the winding of the second winding unit; and
- performing current control differently depending on which short circuit occurs among a short circuit between the ground and the winding of the first or second winding unit and another short circuit between the winding of the first winding unit and the winding of the second winding unit.

7. The control method for a double wound motor of claim 6, wherein:
- the plurality of current control commands corresponding to the pre-stored different patterns of torque ripple are stored according to an abnormality occurrence type,
- the abnormality occurrence type is an abnormality in an inverter or a winding unit, and/or a position of a switch in which a short circuit occurred among comprised switches, and
- the control method further comprises detecting the abnormality occurrence type, and executing a current control command according to the detected abnormality occurrence type.

8. The control method for a double wound motor of claim 6, wherein:
- the plurality of current control commands corresponding to pre-stored different patterns of torque ripple are stored according to an abnormality occurrence type,
- the abnormality occurrence type is an abnormality in an inverter or a winding unit, and/or a short circuit between winding and ground or short circuit between windings, and
- the control method further comprises detecting the abnormality occurrence type, and executing a current control command according to the detected abnormality occurrence type.

9. The control method for a double wound motor of claim 7, wherein the abnormality occurrence type is detected by detecting phase current or counter electromotive voltage.

10. The control method for a double wound motor of claim 8, wherein the abnormality occurrence type is detected by detecting phase current or counter electromotive voltage.

11. The control method for a double wound motor of claim 6, wherein the checking of the pattern of torque ripple in the double wound motor comprises tracking phase current or counter electromotive voltage to check the pattern of torque ripple in the double wound motor.

* * * * *